Figure 1:
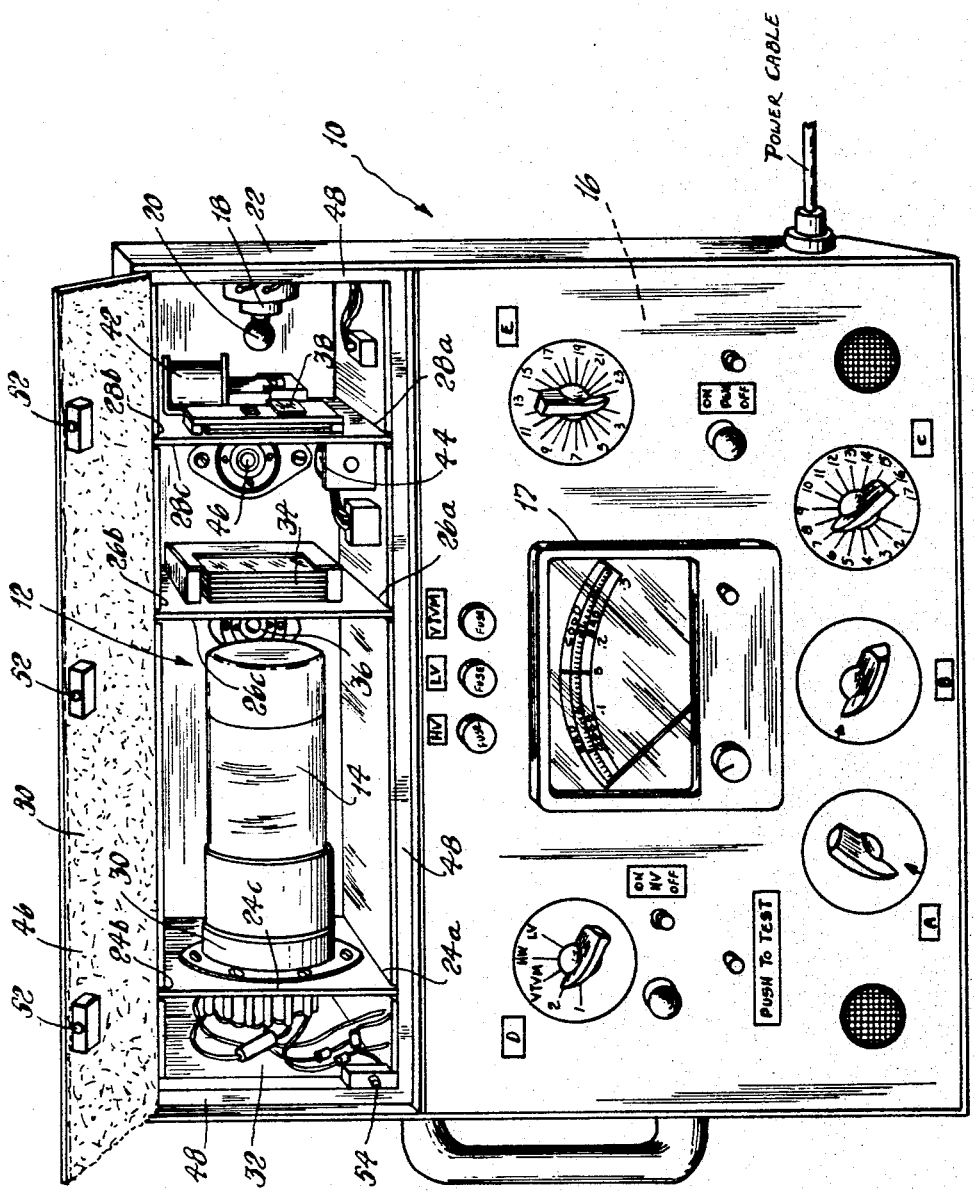

INVENTORS.
MILTON ADELMAN
REUBEN LEIBOWITZ

INVENTORS.
MILTON ADELMAN
REUBEN LEIBOWITZ

INVENTORS.
MILTON ADELMAN
REUBEN LEIBOWITZ

3,333,184
METHOD AND APPARATUS FOR TESTING PHOTOMULTIPLIERS EMPLOYING A COLOR TEMPERATURE CORRECTED LIGHT SOURCE
Milton Adelman, Brooklyn, and Reuben Leibowitz, Elmhurst, N.Y., assignors to the United States of America as represented by the Secretary of the Navy
Filed Feb. 13, 1964, Ser. No. 344,789
5 Claims. (Cl. 324—20)

The invention described herein may be manufactured and used by or for the Government of the United States of America for governmental purposes without the payment of any royalties thereon or therefor.

This invention relates to testing photomultipliers and more particularly to a photomultiplier field tester for use by technicians, maintenance personnel and operating personnel not necessarily knowledgeable in photomultiplier properties and characteristics.

Photomultipliers are difficult to fabricate with operating parameters within close tolerances, are physically delicate to a degree whereby a photomultiplier whose operating parameters are initially within specifications can be rendered unsatisfactory by handling, and are subject to deterioration both in use and on the shelf.

Photomultipliers have wide application in instrumentation and control devices. Regardless of application, it is necessary to ascertain just prior to assembly in an equipment, as well as at intervals when in an equipment, and at any time the equipment appears to be functioning improperly, whether the photomultiplier characteristics are in accordance with specifications. Experience has demonstrated that photomultipliers must be considered suspect from the moment they are delivered by the manufacturer.

Included among the instrumentation available for measuring nuclear radiation is the scintillation counter which has a phosphor or luminophor for converting intercepted radiation to infinitesimal pulses of light, a photomultiplier for intercepting and converting the light into current in a known relationship, and an optical coupling grease between the phosphor and the photomultiplier. Since the order of amplification realized in the photomultiplier is astronomical, even small deviations in the operating parameters of the photomultiplier tube results in vast changes in tube output relative to the norm or specification for that tube. A radiac scintillation-type instrument that has a defective photomultiplier tube is not only valueless but constitutes a serious hazard and an obstacle to orderly operation of nuclear equipment. Radiac scintillation instruments are in use on nuclear ships, in commercial nuclear power plants, laboratories, and are distributed in the military establishment. It is vitally important that the photomultiplier tubes in the radiac scintillation instruments be functioning correctly when the instruments are used. To date, there has been no test equipment available for ascertaining in the field whether a photomultiplier is functioning properly. In the past, the photomultiplier was replaced when the instrument appeared to be functioning improperly but this method proved to be unsatisfactory.

An object of this invention is to provide an improved method and apparatus for testing photomultipliers.

A further object is to provide an equipment for testing at least one type of photomultiplier tube, which equipment may be used by technicians, maintenance men and operating personnel, an equipment that is sufficiently compact so that it may be carried in the manner of a valise to a test site in the field, is light enough for one man to carry, is durable and reliable, is comparatively low in cost, easy to operate, and is generally practical for use by civilian or military personnel in various locations such as a supply depot, a repair facility, or on board ship.

A further object is to provide an equipment suitable for field use by relatively unskilled personnel for testing at least one and preferably as many as possibe of present and future types of photomultipliers, for sensitivity, spectral response, and dark current.

A further object is to provide a tester for 1P21, 931VA, 5819, and 6199 phototubes.

A further object is to provide a tester for all but the outsized or unusual phototubes.

Other objects and advantages will appear from the following description of an example of the invention, and the novel features will be particularly pointed out in the appended claims.

Figure 2:
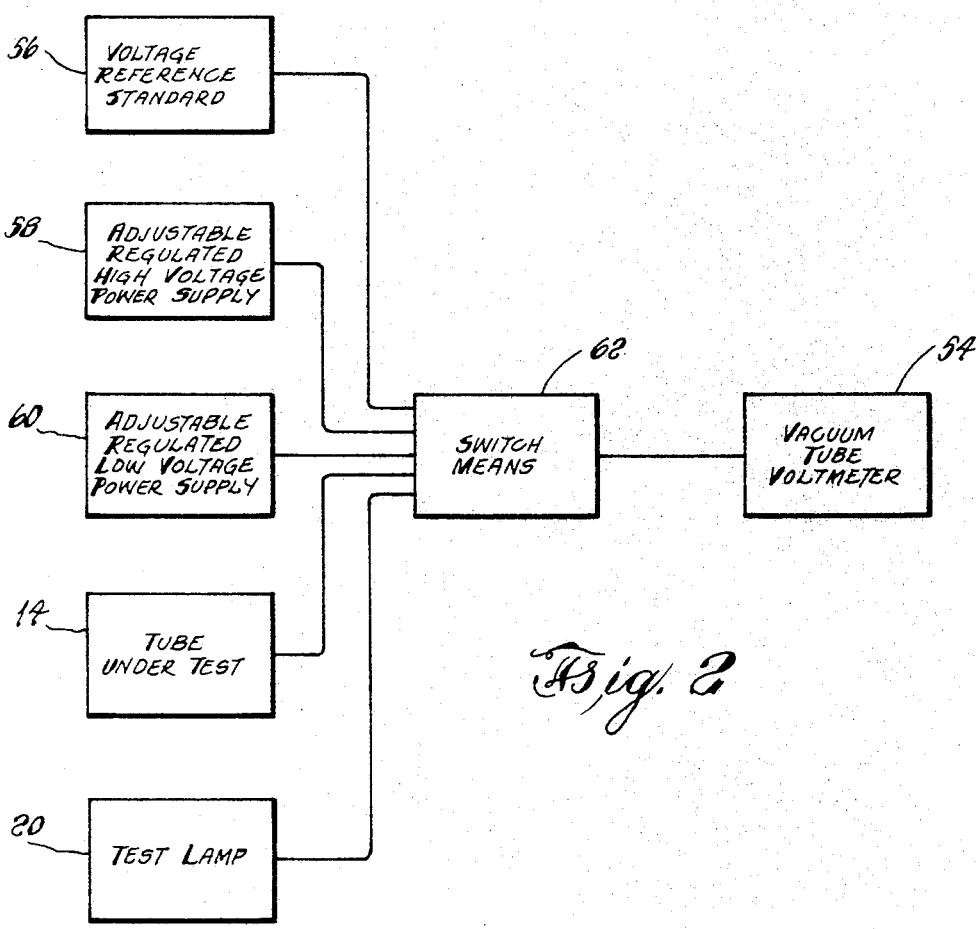
Figure 3A:
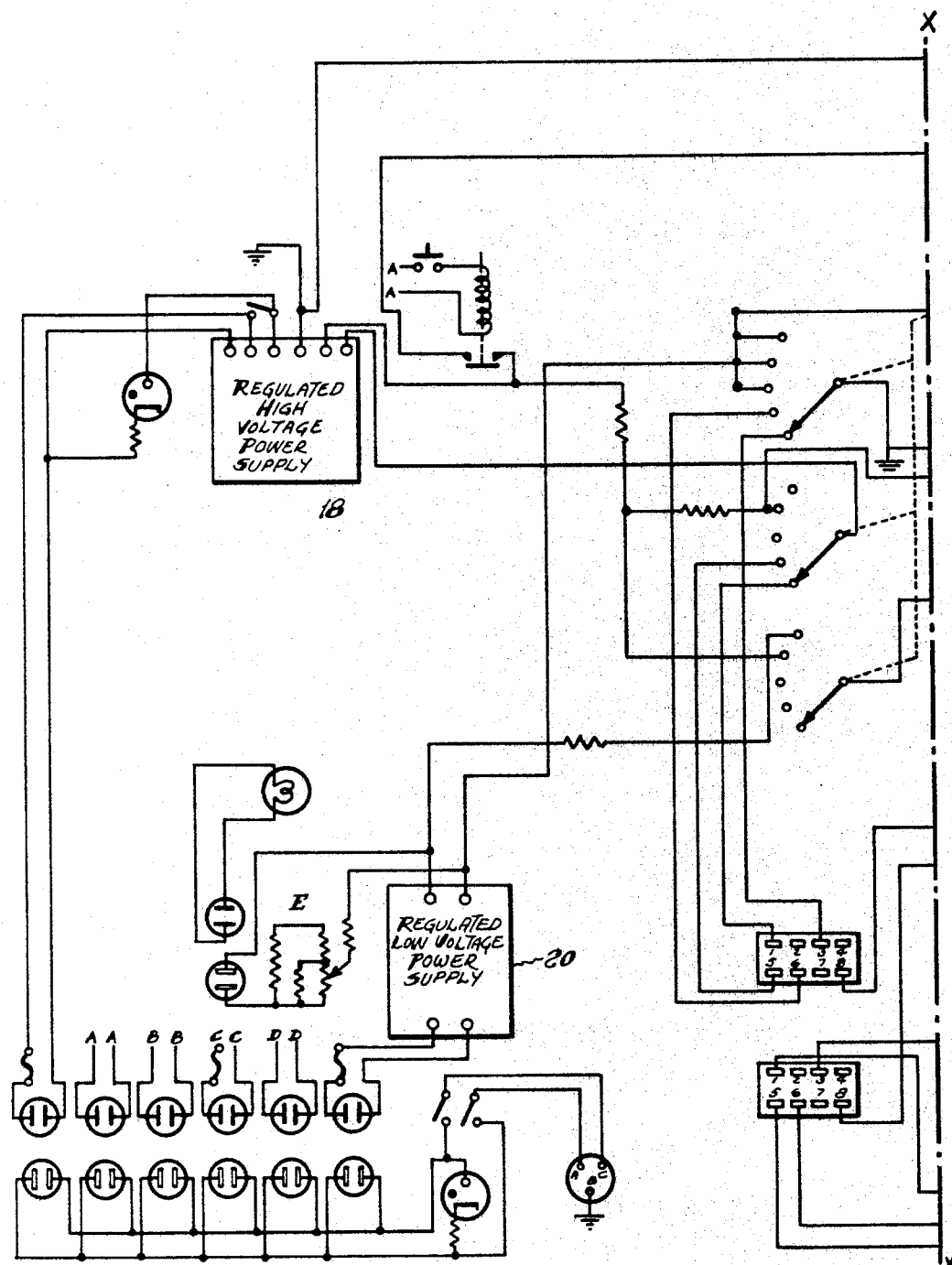
Figure 3B:
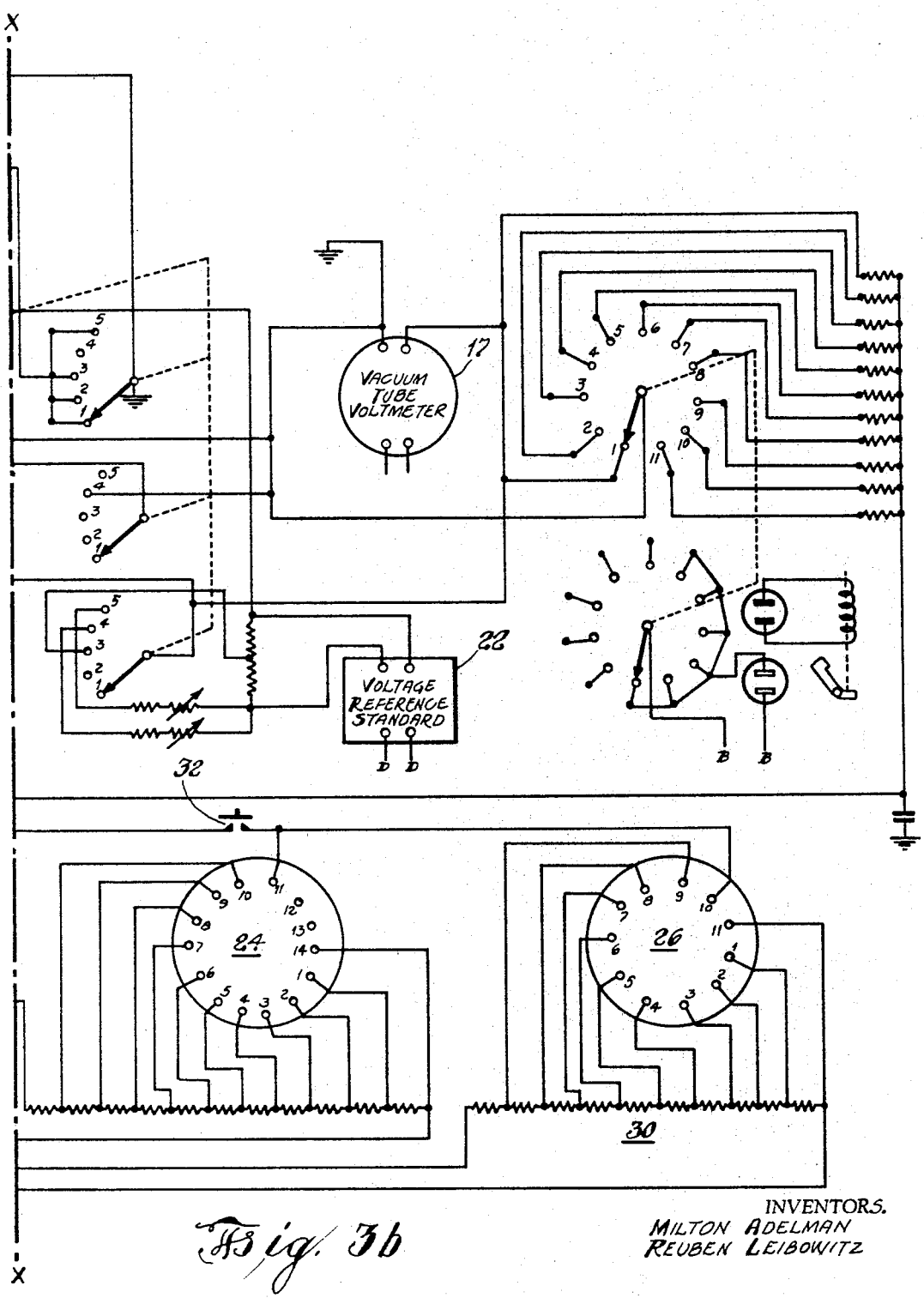
Figure 4:
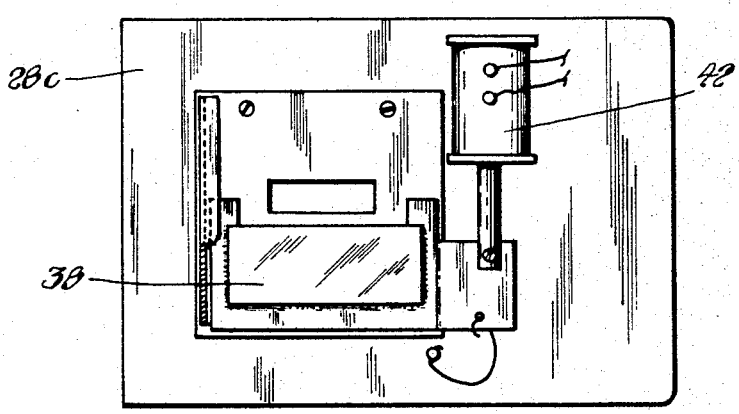
Figure 5:
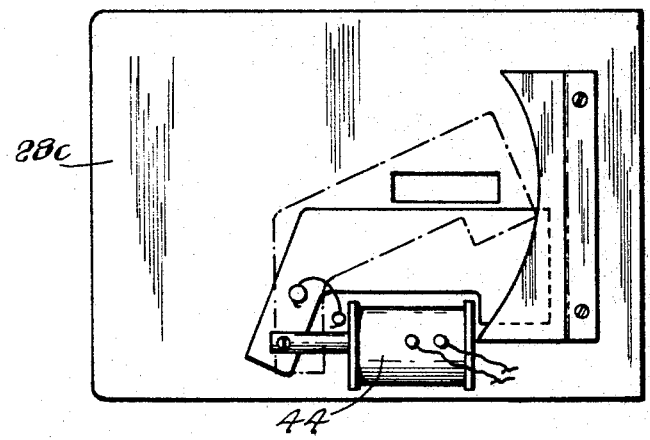

FIG. 1 is a top view in perspective of an embodiment of this invention showing in particular the interior of the photomultiplier test compartment, FIG. 2 is a block diagram of the electrical components of the embodiment in FIG. 2, and FIGS. 3a and 3b are adjoining portions of a schematic circuit diagram of a circuit for the instrument shown in FIG. 1, FIGS. 4 and 5 are plan views of opposite sides of the right-most transverse partition element in the test compartment shown in FIG. 1.

In industry and in the U.S. military establishment, several test parameters have been accepted by usage as standards. $10^{-5}$ lumens of light flux is applied to the photomultiplier tube under test through a rectangular aperture 0.800 inch by 0.200 inch. The spectral energy distribution corresponds to that obtained from a tungsten filament operating at a color temperature of 2870 degrees Kelvin. One test is to ascertain the anode current when rated voltages are applied to the electrodes. Another test is to ascertain the dark current when rated voltages are applied or when voltages are applied that cause a predetermined level of anode current when the tube is exposed to the standard light flux. Another test is to check the spectral response. These tests have been carried out with laboratory type setups by scientists or engineers expert in photomultipliers.

The embodiment of the invention shown in FIG. 1 is a portable photomultiplier test instrument 10 for field use having one compartment 12 for a tube under test, e.g., tube 14, and another compartment 16, not exposed in the drawings, for the circuitry. The walls of compartment 12 are coated with a dull finish black paint to minimize reflection. A base 18 for a miniature single contact bayonet type number 55 incandescent lamp 20 designed for use in automobile headlights is secured centrally to one end wall 22 of compartment 12; lamp 20 serves as a standard test lamp. Paired guideway channels 24a and 24b, 26a and 26b, 28a and 28b are secured to the sidewalls of compartment 12 spaced apart along the length of the compartment to slideably support snug-fitting metallic plates 24c, 26c, 28c, respectively, normal to the axis of lamp 20. The three plates carry latching components (not shown), spring-urged ball or bullet type, that extend normal to one face thereof for engaging complementary latching components, not shown, on the sides or bottom of the compartment 12 to positively locate the three plates in test position. To the plate 24c, furthest from the test lamp 20, is secured a socket 30 coaxial with test lamp 20, for mounting the tube under test 14. Socket wiring including the photomultiplier electrode resistors extend from the end of socket 30 remote from the test lamp 20. The plate 24c is slideable into and out of test position in guideway channels 24a and 24b to facilitate mounting and demounting head-on photomultiplier tube 14 and for maintenance. The space between the end wall 32 of compartment 12 and the plate 24c is designed to accommodate the resistors and wiring.

The intermediate metallic plate 26c is formed with a rectangular aperture, not shown, 0.200 inch by 0.800 inch with the aperture center in line with the axis of test lamp 20 when the plate 26c is in place. Neutral density filters 34 considerably wider and longer than the aperture are slidably mounted in a support secured to one face of plate 26c. Bausch and Lomb Inconel commercially marketed neutral density filters are satisfactory for the purpose. Filters with a variety of transmission factors are marketed. In FIG. 1, three filter sandwiches are shown; while one may be used, the error in neutral density filters is higher in the more dense filters suggesting a stack of less dense filters for less error. Space considerations operate to limit the number of filters. If the distance between the tester is designed for one head-on tube type, the distance between plates 24c and 26c is chosen to be such that the end of tube 14 just clears plate 26c. However, it is deemed advisable to provide sufficient clearance as shown in FIG. 1 for loading and removal of tube 14 in the unlikely event that metallic plates 24c and 26c fail to slide freely. If the tester is designed for various head-on tube types, the distance between plates 24c and 26c is chosen for the longest photomultiplier tube to be tested by the instrument; a distance of 6 5/16 inches was found by investigation to be suitable for most present and anticipated head-on tube types, including socket adaptor. Alternatively, for each head-on tube type the instrument is provided with a special assembly of plate 24c, socket 30, resistors, wiring and an adaptor, if necessary, for locating the head end of the respective tube type near the plate 26c. The socket wiring is connected with detachable couplings to the test circuitry wiring that terminates in the compartment 12.

The distance between the filament of the test lamp and head end of the photomultiplier should be such that the test lamp closely approximates a point source; for this purpose the distance should be at least 10 times the length of the filament. A compartment length of 14 inches has been found by investigation to be adequate to meet the requirements of most head-on tubes and is consistent with portability.

A wired socket 36 for vertical tubes is secured to the floor of the compartment 12. The depth of compartment 12 is selected to accommodate the longest vertical type photomultiplier plus adaptor to be mounted in socket 36; a depth of less than 5½ inches was found by investigation to be adequate for most tubes presently known and contemplated. The location of the axis of socket 36 and its orientation is chosen to centrally expose the sensitive element of the tube to the luminous flux from the test lamp 20. To accommodate an exceptionally large diameter tube type, an additional pair of guideway channels, not shown, may be provided for the plate 26c further from the axis of socket 36 than shown in FIG. 1. Compartment width of 4½ inches was found by investigation to be adequate for most vertical type tubes presently known and contemplated.

The lamp 20 is type 55 chosen on the basis of a number of considerations arrived at after careful study and investigation. The bulb must be small to minimize instrument size and must be as rugged as possible for portability and should have the clearest and simplest envelope. It should maintain calibration or operating characteristics for at least 100 hours and preferably much longer; it must have a base that lends itself to precise location in place in its socket repeatably. Its filament should be operable at a temperature near 2870 degrees Kelvin and operate at the lowest practical power. Extensive investigation established that the type 55 lamp is the only lamp capable of meeting all these requirements. It is designed to operate at 6 volts, 450 milliamperes, for a filament temperature of about 2800 degrees Kelvin and is a bayonet single-contact type bulb. All screw type lamps were determined to be unsuitable because they could not be located in place repeatably with precision. Bayonet dual contact bulbs were determined to be not as satisfactory as a bayonet single contact bulb because they do not make as good contact. Searchlight, bicycle, decorative and other small bulbs are unsuitable because they have screw type bases, are not rugged, operate at too low a temperature, etc. The advantage of using a commercially marketed lamp such as type 55 instead of a specially fabricated lamp is that it can be obtained easily and regardless where obtained, will have essentially the same characteristics.

An important aspect of this invention is that the inexpensive, commercially marketed tungsten filament type 55 automobile headlight lamp or equivalent is operated at reduced power level to minimize temperature rise in the tube compartment 12 and to minimize operating temperature rise in the circuitry compartment 16 sufficiently to preclude need for cooling equipment. Weight, size, complexity, and cost of the instrument is thereby minimized notwithstanding the reduced operating temperature of the test lamp filament, the test flux directed to the tube under test has essentially the spectral energy distribution of luminous flux from a filament operating at 2870 degrees Kelvin color temperature.

The lamp 20 is operated at below rated voltage producing less than rated luminous flux output and at a color temperature substantially below 2870 degrees Kelvin required for the test. The luminous flux is directed through a color temperature altering filter 38 for altering the spectral energy distribution of the luminous flux from lamp 20 to essentially that corresponding to 2870 degrees Kelvin. A major advantage realized by this method of operation is that the life of the lamp 20 is extended indefinitely, i.e. far beyond the reasonably expected life of the instrument. Another far more significant advantage is that the lamp used in this manner is in effect a constant unchanging light source because deterioration becomes negligible. Other advantages are that the power supply requirements are lessened, the heat dissipation in the instrument is made low enough not to require special cooling facilities, and the lowered light output obtained at the reduced operating voltage is more than adequate for testing photomultipliers and does not require as many attenuating elements to reduce the flux to $10^{-5}$ lumens. If the lamp is operated at a voltage corresponding to 2870 degrees, the additional light flux must simply be attenuated.

Corning Glass markets a variety of color temperature altering filters and can fabricate on order a filter for altering a spectral energy distribution of luminous flux substantially different from 2870 degrees Kelvin to that corresponding to 2870 degrees Kelvin. In accordance with this invention the color temperature of the lamp is calibrated as a function of filament voltage and filament current and the lamp 20 is operated at a filament voltage and current corresponding to the selected color temperature. In a successfully built and operated embodiment of the invention the filament of the test lamp 20 was operated at 2400 degrees Kelvin. The luminous flux emitted by the lamp is directed through Corning filter type 1–69, 0.100 inch thick to alter the 2400 degree Kelvin color temperature spectral energy distribution to duplicate closely the spectral energy distribution of 2870 degrees Kelvin. Color temperature of 2400 degrees Kelvin is not critical to the invention; color temperature altering filters are obtainable for other temperatures and the state of the art is such that if presently available filters are not adequate, a color altering filter capable of altering spectral energy distribution to satisfy chosen operating conditions is readily obtainable from business firms experienced in this field.

Plate 28c supports the color temperature altering filter 38. The plate 28c is formed with an aperture of approximately the same geometry as the aperture in plate 26c similarly oriented and with its center in line with the lamp axis and of sufficient area to permit the aperture in plate 26c to be fully illuminated by luminous flux from lamp 20. It is desirable for the aperture in plate 28c to be no larger than necessary to minimize reflections and to minimize flux attenuation requirements. The color altering filter may be cemented in place on plate 28c, but to add versatility to the instrument, the color temperature altering filter is mounted in an aperture of an opaque plate which is slidable in guides, not shown, to occupy one of two positions; in one position the aperture is completely covered by a portion of the slidable opaque plate and in the other position of the opaque plate the color temperature altering filter 38 extends across the aperture in the plate 28c. The opaque plate may be positioned manually but in the embodiment shown in FIG. 1, a solenoid 42 is mounted on the plate 28c and operatively connected to the opaque plate to displace the plate from either of its two positions to the other. A second solenoid 44 is mounted on the other face of plate 28c and connected to a pivotally supported narrow band filter occupying one position across the aperture of plate 28c and occupying another position out of the path of the luminous flux for use in checking spectral response of the tube 14 to energy in a selected portion of the spectral energy distribution band corresponding to 2870 degrees Kelvin color temperature. Flters for this purpose are obtainable commercially, e.g. from Corning Glass Co.

A wired socket 46 for a PJ22 (not shown) is mounted on the floor of the compartment 12 near the face of plate 28c remote from test lamp 20. The PJ22 is initially calibrated in place and is used to check the calibration of the test lamp 20 or to calibrate a replacement; its long term stability qualifies the PJ22 for this purpose.

The compartment 12 is provided with a hinged cover 46 that seats on a flange 48 surrounding the rim of the compartment 12. The inside surface of the cover is covered with black felt 50. The cover is provided with three spring-urged latches 52. When the cover is closed, the plates 24c, 26c and 28c recess into the felt 50 and the flange 48 firmly engages the felt. To protect the photomultiplier when the cover 46 is opened, a push-button switch 54 is mounted in the compartment 12 to be engaged by the cover when latched in place. When the cover is moved slightly away from engagement with flange 48, switch 54 is actuated; switch 54 operates to terminate the electrode voltages of tube 14 as the cover is opened.

The test circuitry included in the compartment 16 is shown in FIGS. 2 and 3 and includes a vacuum tube voltmeter 54, a voltage reference standard 56, an adjustable regulated high voltage power supply 58, an adjustable regulated low voltage power supply 60, and switch means 62; all of these components are available commercially and are selected in accordance with the performance characteristics required for carrying out tests on the tube(s) for which the tester is designed. A tester in accordance with this invention was fabricated and successfully operated for testing photomultiplier types 1P21, 931A, 5819, and 6199 and most other present day and anticipated types of photomultipliers. A review of test requirements indicated that the regulated high voltage power supply should be capable of providing continuously adjustable potentials ranging from 700 to 1600 volts D.C. at a current of 5 milliamperes, that its r.m.s. ripple voltage shall be less than 100 millivolts and that the voltage applied to any tube under test shall not deviate more than plus or minus 0.1 percent under any combination of test conditions and that the voltage shall be stable within ±0.1 percent for a period of 2 hours after the initial 10 minutes warmup period. A variety of regulated high voltage power supplies commercially available are capable of satisfying these requirements, e.g. regulated high voltage power supply Model RE–1602 of Northeast Scientific Corporation, 30 Wetherbee St., Acton, Mass., is satisfactory or at most requiring only physical rearrangement to fit in the compartment 16. The high voltage supply 58 includes a fine adjustment A and coarse adjustment B shown in FIGS. 1 and 3.

The regulated low voltage power supply 60 should be capable of providing continuously adjustable potentials between 4 and 8 volts at a current of 500 milliamperes for the test lamp 20. The voltage supplied shall not deviate more than plus or minus 0.2 percent under any combination of operating conditions and the r.m.s. ripple voltage shall be less than 3 millivolts. A variety of regulated low voltage power supplies commercially available are capable of satisfying these requirements, e.g. highly regulated miniature low voltage supply model QM 6.3–.64 of Sorensen & Company, Inc., Richards Ave., South Norwalk, Conn. is satisfactory. A continuously adjustable voltage divider E shown in FIGS. 1 and 3 is connected between power supply 60 and test lamp 20 to adjust the voltage to the lamp.

The meter 54 should be operable to function as the indicator for photomultiplier anode current, calibration of high voltage supply potential, calibration of low voltage supply potential and self calibration. Vacuum tube voltmeter model 320/.3 of Metronix, Inc. is satisfactory.

The voltage reference standard 56 is included to provide a reference for calibrating the meter 54, the high voltage power supply 58 and the low voltage power supply 60. The reference standard preferably is a solid state device (Zener diode) with an output of about 6 volts D.C. The output voltage should not deviate more than ±0.01 percent under any combination of operating conditions; model 221B of Dynage, Inc., 390 Capitol Ave., Hartford, Conn., is satisfactory.

No representation is made that any of the preceding commercial products are the best available on the market but are merely cited as examples of suitable products on the commercial market.

The detailed circuit diagram shown in FIG. 3 was successfully operated in the instrument shown in FIG. 1. The switching means is operated under the guidance of an instruction chart in a manner analogous to the tube testers designed for use by the public in testing radio and television tubes.

The sensitivity test for each tube is carried out at rated electrode voltages with the color temperature altering filter in place. The dark current test is performed either at rated electrode voltages or at voltages that produce a selected level at anode current when the test flux is transmitted to the tube. For the dark current test the solenoid 42 moves the opaque plate carrying the color temperature altering filter across the aperture in the plate 28c. The spectral response test is carried out with the spectral filter in position in the path of the luminous flux; in other words, the luminous flux pass through the color temperature altering filter and the spectral response filter.

This invention contemplates a tester for one tube type as well as a tester for a variety of tube types as described herein and also contemplates a tester wherein the compartment 12 is in a separate cabinet. Operations performed by the solenoids 42 and 44 may be performed manually.

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:
1. A photomultiplier tester comprising:
   an elongated light-tight housing having a closure forming one side thereof and selectively operable to provide access to the interior of the housing and to enclose a light-tight compartment inside the housing;
   a miniature, clear, single contact bayonet type in- candescent filament lamp mounted near one end of the compartment and oriented such that its axis is directed toward the other end of the compartment;

guide channels between the ends of the compartment transverse to the axis of the lamp;

a photomultiplier socket;

means mounting said socket and slidable in said guide channels into and out of a predetermined position in said compartment to facilitate loading and unloading a photomultiplier under test;

light-tight means extending across said compartment intermediate the guide channels and the lamp, said light-tight means having an aperture for transmitting radiant flux from the lamp to a photomultiplier under test;

neutral density filter means mounted on said light-tight means across the aperture therein to attenuate radiant flux from the lamp to a level required for testing;

another light-tight means extending across said compartment between the lamp and said first-mentioned light-tight means and having an aperture large enough to transmit radiant flux from the lamp to illuminate the entire aperture of the first mentioned light-tight means;

a color temperature altering filter mounted across the aperture in the latter light-tight means for altering the spectral energy distribution of flux from the lamp to approximate that from a filament operating at a predetermined color temperature.

2. A photomultiplier tester as defined in claim 1, further including a narrow band filter mounted in said second mentioned light-tight means and slidable to one position across the aperture therein and slidable to another position out of the path of the flux directed through the aperture therein.

3. A photomultiplier tester as defined in claim 2, wherein said color temperature altering filter is part of a rigid assembly slidable across the aperture in said second-mentioned light-tight means and wherein in one position of said slidable assembly, said color temperature altering filter is positioned across the aperture in the path of the flux from the lamp to the photomultiplier under test and in another position of said slidable assembly a portion thereof opaque to the flux is disposed across the aperture in said second-mentioned light-tight means to block all flux from said lamp from passing through the aperture therein.

4. A photomultiplier tester as defined in claim 3, further including two solenoids mounted on said second mentioned light-tight means, one solenoid being linked to said rigid assembly including the color temperature altering filter for selectively positioning the latter, the other solenoid being linked to said narrow band filter for selectively positioning the latter.

5. A photomultiplier tester as defined in claim 4, further including electrical means selectively operable for energizing the lamp and the photomultiplier under test, each of said solenoids, and for indicating selected parameters under selected test conditions.

References Cited
UNITED STATES PATENTS
2,621,557 12/1952 Kavanaugh _____ 250—239 X
2,765,440 10/1956 Adelman _____ 324—20

FOREIGN PATENTS
739,340 10/1955 Great Britain.

RUDOLPH V. ROLINEC, *Primary Examiner.*

WALTER L. CARLSON, *Examiner.*

E. L. STOLARUN, *Assistant Examiner.*